Jan. 28, 1936. W. H. BASELT Re. 19,835
BRAKE MECHANISM
Original Filed Oct. 11, 1928 2 Sheets-Sheet 1
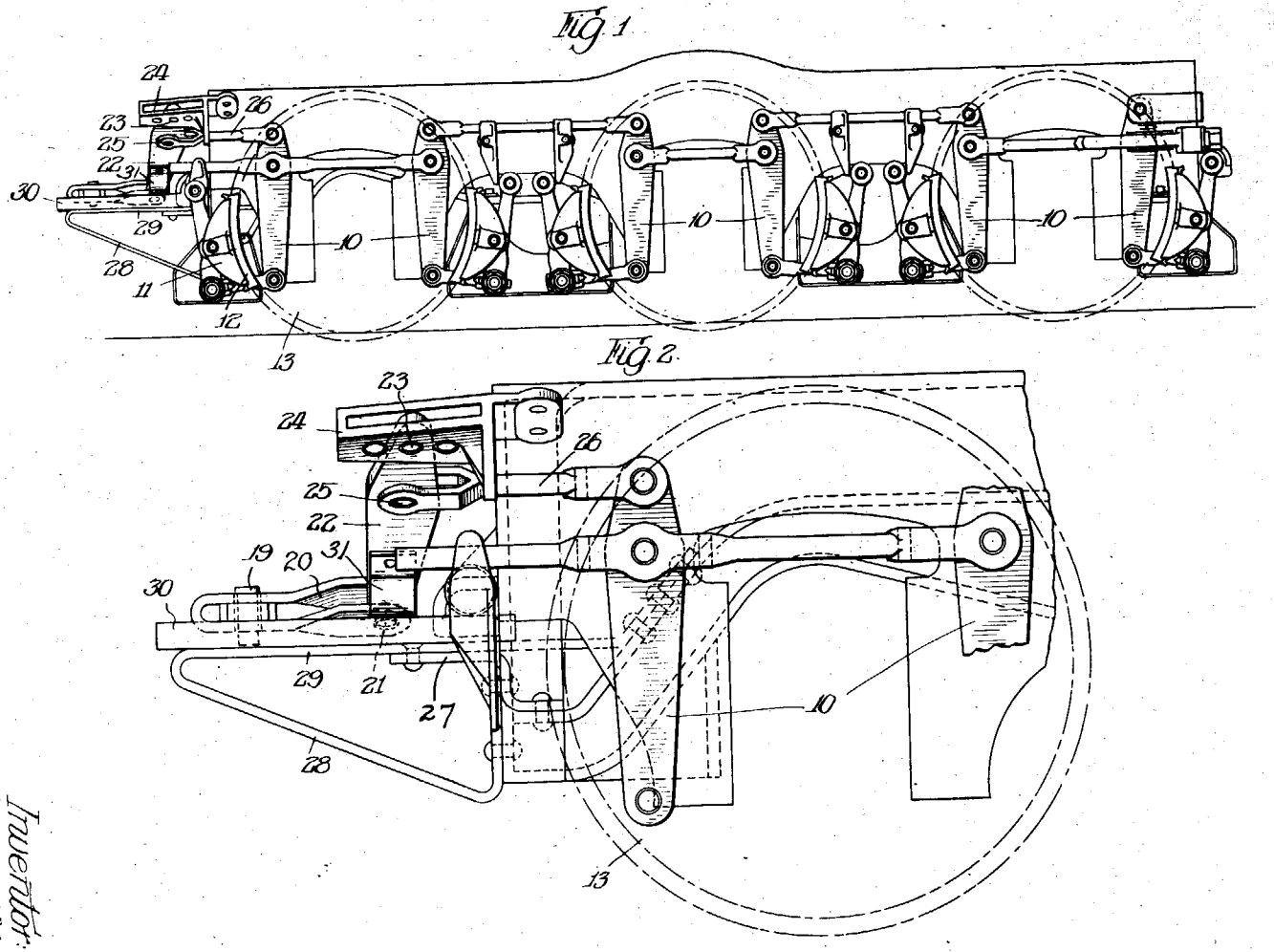
Inventor:
Walter H. Baselt,
By Wilkinson, Huxley, Byron & Knight Attys.

Jan. 28, 1936. W. H. BASELT Re. 19,835

BRAKE MECHANISM

Original Filed Oct. 11, 1928 2 Sheets-Sheet 2

Inventor:
Walter H. Baselt,
By Wilkinson, Huxley, Byron & Knight Attys

Reissued Jan. 28, 1936 Re. 19,835

UNITED STATES PATENT OFFICE 19,835

BRAKE MECHANISM

Walter H. Baselt, Chicago, Ill., assignor to American Steel Foundries, Chicago, Ill., a corporation of New Jersey Original No. 1,797,895, dated March 24, 1931, Serial No. 311,755, October 11, 1928. Application for reissue February 11, 1935, Serial No. 6,008

36 Claims. (Cl. 188—56)

This invention relates to brake mechanism for railway trucks, particularly for use on locomotive trailer trucks.

One object of the invention is to provide a simple, durable and efficient brake mechanism arrangement in which the various parts cooperate in a manner to meet service requirements and which is adapted to meet the peculiar and close clearance conditions which obtain in a locomotive trailer truck.

This and other objects are accomplished by means of the arrangement disclosed on the accompanying sheets of drawings, in which—

Figure 1 is a fragmentary side elevation of a railway truck including brake mechanism embodying my invention;

Figure 2 is a side elevation of a portion only of the brake mechanism on a larger scale, embodying my invention;

The various novel features of the invention will be apparent from the following description and drawings, and will be particularly pointed out in the appended claims.

Referring to the figures of the drawings, it will be noted that the invention is illustrated in connection with clasp type of brake mechanism as applied to a locomotive trailer truck.

It will be sufficient in a general description of a part of the mechanism to state that properly supported interconnected truck levers 10 are mounted on each side of the truck and are operatively connected to brake heads 11 carrying brake shoes 12 adapted to engage or clasp opposite sides of the associated truck wheels 13 for braking purposes. The invention has to do primarily with the brake mechanism arrangement at the locomotive end of the trailer truck.

Figure 3:
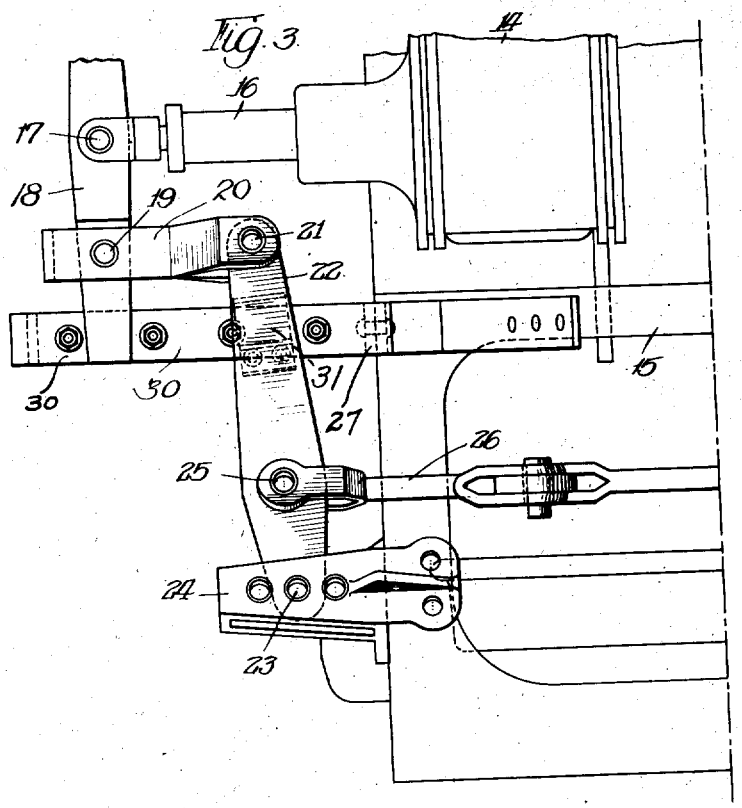
Figure 3 is a top plan view of the arrangement shown in Figure 2.
Figure 4:
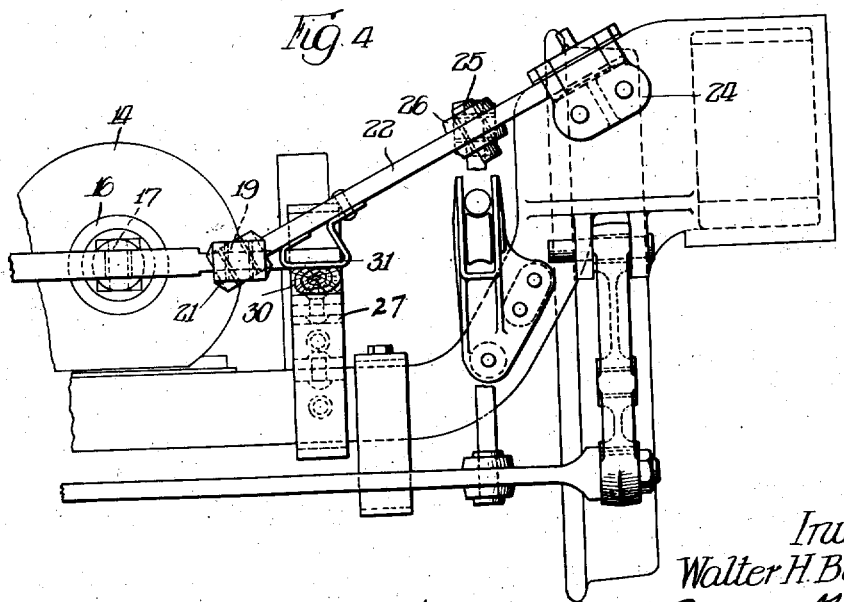
Figure 4 is an end elevation of the arrangement shown in Figure 2.

Referring particularly to Figures 2, 3 and 4, it will be noted that a brake cylinder 14 is mounted centrally of the truck frame 15 at the motor end or on the end sill thereof, said cylinder having an associated piston rod 16 pivotally connected to the middle point 17 of an equalizer lever 18. In view of the fact that the brake mechanism is duplicated on opposite sides of the equalizing lever, it will be sufficient to describe that mechanism on one side only. Pivotally connected at 19 to an intermediate point of the equalizing lever 18 is a strap link 20, to one end of which at 21 is pivotally connected the lower end of a dead brake or dead cylinder lever 22 which extends upwardly and outwardly toward the side of the truck. The upper end of the cylinder lever 22 is pivotally connected at 23 to a bracket 24 connected to the truck frame 15 at one end thereof at a point in the same longitudinal plane as the truck wheels 13. Pivotally connected at 25 to an intermediate point of the cylinder lever 22 is a pull rod 26 which is operatively connected to the truck levers 10 on the associated side of the truck.

For properly supporting the brake mechanism in its operative movements at the motor end of the truck, a bracket 27 is provided, which bracket is connected to and supported by the truck frame 15 adjacent to and at one side of the cylinder 14. In this particular instance, the bracket takes the form of a strap 28 in the form of a triangle and having an upper horizontally arranged portion 29 upon which preferably there is secured a block 30 for providing an upper surface upon which one end of the equalizing lever 18 moves or slides. Connected to the cylinder lever 22 near the lower end thereof is a shoe 31 formed of strap metal and having a horizontal portion which is slidably mounted upon the upper surface of the block 30. It will be seen, therefore, that the bracket 27 furnishes a slidable support not only for the equalizing lever 18 but also for the associated cylinder lever, each of which is operatively connected to the equalizing lever and the truck levers. In addition to forming a slidable support for said equalizing and cylinder levers, the associated brackets act as safety elements for preventing said levers from falling to the ground in the event they become disconnected from their normal attachments or hangings.

It will be appreciated that when the equalizing lever 18 is forced outwardly during the braking action, the link 20 and all of the rods connected to the cylinder levers and truck levers will be in tension for applying braking pressures to the truck wheels.

By means of the arrangement herein particularly shown and described, the object of the invention is accomplished.

It is my intention to cover all modifications of the invention falling within the spirit and scope of the following claims.

I claim:

1. In brake mechanism for railway trucks, the combination of a truck frame, truck brake levers, a brake cylinder carried by said frame, an equalizing lever operatively associated with said cylinder, a cylinder lever operatively connected to said equalizing lever and said brake levers, and a bracket carried by said frame upon which both said equalizing lever and said cylinder lever are movably supported.

2. In brake mechanism for railway trucks, the combination of a truck frame, truck brake levers, a brake cylinder carried by said frame, an equalizing lever operatively associated with said cylinder, a cylinder lever operatively connected to said equalizing lever, and means carried by said frame upon which both said equalizing lever and said cylinder lever are slidably supported.

3. In brake mechanism for railway trucks, the combination of a truck frame, a brake cylinder carried by said frame, an equalizing lever operatively associated with said cylinder, a cylinder lever operatively connected to said equalizing lever, and a bracket carried by said frame upon which both said equalizing lever and said cylinder lever are movably supported.

4. In brake mechanism for railway trucks, the combination of a truck frame, a brake cylinder carried by said frame centrally at one end thereof, truck levers arranged on opposite sides of said truck, an equalizing lever operatively associated with said cylinder, cylinder levers arranged on opposite sides of said cylinder and operatively connected to said equalizing lever and the associated truck levers, and brackets carried by said frame upon opposite sides of said cylinder, each of which brackets movably supports said equalizing lever and the associated cylinder lever.

5. In brake mechanism for railway trucks, the combination of a truck frame, truck brake levers, a brake cylinder mounted on said truck frame, an equalizing lever connected to the piston rod associated with said cylinder, a bracket carried by said frame upon which said equalizing lever is movably mounted, a link pivotally connected to said equalizing lever, a cylinder lever pivotally connected to said link and also slidably mounted on said bracket, and a second bracket carried by said frame to which said cylinder lever is pivoted, said cylinder lever being operatively connected to said truck brake levers.

6. In brake mechanism for railway trucks, the combination of a truck frame, truck brake levers, a brake cylinder mounted at one end of the truck frame and centrally thereof, a horizontal equalizing lever connected to the piston rod associated with said cylinder, a bracket carried by said frame upon which said equalizing lever is slidably mounted, a link connected to said equalizing lever, a supported inclined cylinder lever pivotally connected to said link and also slidably mounted on said bracket, said cylinder lever being operatively connected to said truck brake levers.

7. In a brake arrangement, the combination of a truck frame, wheels supporting said truck frame, brake rigging adapted to have braking cooperation with said wheels, means for operating said brake rigging, said means including a substantially transversely arranged dead brake lever pivotally supported adjacent the outer end thereof to said truck frame, a connection between said brake rigging and said brake lever intermediate the ends of said brake lever, an equalizer lever slidably supported with respect to said truck frame and connected adjacent one end thereof to the inner end of said brake lever, and means connected to said equalizer lever for controlling movement thereof.

8. In a brake arrangement, the combination of a truck frame, wheels supporting said truck frame, brake rigging adapted to have braking cooperation with said wheels, means for operating said brake rigging, said means including a substantially transversely arranged dead brake lever pivotally supported adjacent the outer end thereof to said truck frame, a connection between said brake rigging and said brake lever intermediate the ends of said brake lever, an equalizer lever slidably supported with respect to said truck frame and connected adjacent one end thereof to the inner end of said brake lever, and a brake cylinder supported on said truck frame adjacent the longitudinal center line thereof and having the piston thereof connected adjacent the center of said equalizer lever for controlling movement thereof.

9. In a brake arrangement, the combination of a truck frame having an end sill, wheels supporting said truck frame, brake rigging adapted to have braking cooperation with said wheels, means for operating said brake rigging, said means including a substantially transversely arranged dead brake lever pivotally supported adjacent the outer end thereof to said truck frame, a connection between said brake rigging and said brake lever intermediate the ends of said brake lever, an equalizer lever slidably supported with respect to said truck frame and connected adjacent one end thereof to the inner end of said brake lever, and a brake cylinder supported on said end sill adjacent the center thereof and having the piston thereof connected adjacent the center of said equalizer lever for controlling movement thereof.

10. In a brake arrangement, the combination of a truck frame having an end sill, wheels supporting said truck frame, brake rigging adapted to have braking cooperation with said wheels, means for operating said brake rigging, said means including a substantially transversely arranged dead brake lever pivotally supported adjacent the outer end thereof to said truck frame, a connection between said brake rigging and said brake lever intermediate the ends of said brake lever, an equalizer lever slidably supported with respect to means provided on said end sill and connected adjacent one end thereof to the inner end of said brake lever, and a brake cylinder supported on said end sill adjacent the center thereof and having the piston thereof connected adjacent the center of said equalizer lever for controlling movement thereof.

11. In a brake arrangement, the combination of a truck frame, wheels supporting said truck frame, brake rigging adapted to have braking cooperation with said wheels, means for operating said brake rigging, said means including a dead brake lever pivotally mounted on said truck frame outwardly thereof, a connection between said brake rigging and said brake lever intermediate the ends of said truck lever, an equalizer lever slidably supported with respect to said truck frame and connected adjacent one end thereof to the other end of said brake lever, and means connected to said equalizer lever for controlling movement thereof.

12. In a brake arrangement, the combination of a truck frame, wheels supporting said truck frame, brake rigging adapted to have braking cooperation with said wheels, means for operating said brake rigging, said means including a dead brake lever pivotally mounted on said truck frame outwardly thereof, a connection between said brake rigging and said brake lever intermediate the ends of said brake lever, an equalizer lever slidably supported with respect to said truck frame and connected adjacent one end thereof to the other end of said brake lever, and a brake cylinder supported on said truck frame adjacent the longitudinal center line thereof and having the piston thereof connected adjacent the center of said equalizer lever for controlling movement thereof.

13. In a brake arrangement, the combination of a truck frame, wheels supporting said truck frame, brake rigging adapted to have braking cooperation with said wheels, means for operating said brake rigging, said means including a dead brake lever pivotally mounted on said truck frame outwardly thereof, a connection between said brake rigging and said brake lever intermediate the ends of said brake lever, an equalizer lever slidably supported with respect to said truck frame outwardly thereof and connected adjacent one end thereof to the other end of said brake lever, and means connected to said equalizer lever for controlling movement thereof.

14. In a brake arrangement, the combination of a truck frame, wheels supporting said truck frame, brake rigging adapted to have braking cooperation with said wheels, means for operating said brake rigging, said means including a dead brake lever pivotally mounted on said truck frame outwardly thereof, a connection between said brake rigging and said brake lever intermediate the ends of said brake lever, an equalizer lever slidably supported with respect to said truck frame outwardly thereof and connected adjacent one end thereof to the other end of said brake lever, and a brake cylinder supported on said truck frame adjacent the longitudinal center line thereof and having the piston thereof connected adjacent the center of said equalizer lever for controlling movement thereof.

15. In a brake arrangement, the combination of a truck frame, wheels supporting said truck frame, brake rigging adapted to have braking cooperation with said wheels, means for operating said brake rigging, said means including a substantially transversely arranged dead brake lever pivotally supported adjacent the outer end thereof to said truck frame, a connection between said brake rigging and said brake lever intermediate the ends of said brake lever, an equalizer lever slidably supported with respect to said truck frame and connected adjacent one end thereof to the inner end of said brake lever, and a brake cylinder supported on said truck frame adjacent the longitudinal center line thereof and having the piston thereof connected adjacent the center of said equalizer lever for controlling movement thereof, said piston operating in a direction outwardly of said truck frame.

16. In a brake arrangement, the combination of a truck frame having an end sill, wheels supporting said truck frame, brake rigging adapted to have braking cooperation with said wheels, means for operating said brake rigging, said means including a substantially transversely arranged dead brake lever pivotally supported adjacent the outer end thereof to said truck frame, a connection between said brake rigging and said brake lever intermediate the ends of said brake lever, an equalizer lever slidably supported with respect to said truck frame and connected adjacent one end thereof to the inner end of said brake lever, and a brake cylinder supported on said end sill adjacent the center thereof and having the piston thereof connected adjacent the center of said equalizer lever for controlling movement thereof, said piston operating in a direction outwardly of said end sill.

17. In a brake arrangement, the combination of a truck frame having an end sill, wheels supporting said truck frame, brake rigging adapted to have braking cooperation with said wheels, means for operating said brake rigging, said means including a substantially transversely arranged dead brake lever pivotally supported adjacent the outer end thereof to said truck frame, a connection between said brake rigging and said brake lever intermediate the ends of said brake lever, an equalizer lever slidably supported with respect to means provided on said end sill and connected adjacent one end thereof to the inner end of said brake lever, and a brake cylinder supported on said end sill adjacent the center thereof and having the piston thereof connected adjacent the center of said equalizer lever for controlling movement thereof, said piston operating in a direction outwardly of said end sill.

18. In a brake arrangement, the combination of a truck frame, wheels supporting said truck frame, brake rigging adapted to have braking cooperation with said wheels, means for operating said brake rigging, said means including a dead brake lever pivotally mounted on said truck frame outwardly thereof, a connection between said brake rigging and said brake lever intermediate the ends of said brake lever, an equalizer lever slidably supported with respect to said truck frame and connected adjacent one end thereof to the other end of said brake lever, and a brake cylinder supported on said truck frame adjacent the longitudinal center line thereof and having the piston thereof connected adjacent the center of said equalizer lever for controlling movement thereof, said piston operating in a direction outwardly of said truck frame.

19. In a brake arrangement, the combination of a truck frame, wheels supporting said truck frame, brake rigging adapted to have braking cooperation with said wheels, means for operating said brake rigging, said means including a dead brake lever pivotally mounted on said truck frame outwardly thereof, a connection between said brake rigging and said brake lever intermediate the ends of said brake lever, an equalizer lever slidably supported with respect to said truck frame outwardly thereof and connected adjacent one end thereof to the other end of said brake lever, and a brake cylinder supported on said truck frame adjacent the longitudinal center line thereof and having the piston thereof connected adjacent the center of said equalizer lever for controlling movement thereof, said piston operating in a direction outwardly of said truck frame.

20. In a brake arrangement, the combination of a truck frame, wheels supporting said truck frame, brake rigging adapted to have braking cooperation with said wheels, means for operating said brake rigging, said means including a dead brake lever pivotally mounted on said truck frame, a connection between said brake rigging and said brake lever intermediate the ends of said brake lever, an equalizer lever slidably supported with respect to said truck frame outwardly thereof and connected adjacent one end thereof to the other end of said brake lever, and means connected to said equalizer lever adjacent the center thereof for controlling movement thereof.

21. In a brake arrangement, the combination of a truck frame, wheels supporting said truck frame, brake rigging adapted to have braking cooperation with said wheels, means for operating said brake rigging, said means including a dead brake lever pivotally mounted on said truck frame, a connection between said brake rigging and said brake lever intermediate the ends of said brake lever, an equallizer lever slidably supported with respect to said truck frame, and a brake cylinder supported on said truck frame adjacent the longitudinal center line thereof and having the piston thereof connected adjacent the center of said equalizer lever for controlling movement thereof.

22. In a brake arrangement, the combination of a truck frame, wheels supporting said truck frame, brake rigging adapted to have braking cooperation with said wheels, means for operating said brake rigging, said means including a dead brake lever pivotally mounted on said truck frame outwardly thereof, a connection between said brake rigging and said brake lever intermediate the ends of said brake lever, an equalizer lever slidably supported with respect to said truck frame, and a brake cylinder supported on said truck frame adjacent the longitudinal center line thereof and having the piston thereof connected adjacent the center of said equalizer lever for controlling movement thereof, said piston operating in a direction outwardly of said truck frame.

23. In a brake arrangement, the combination of a truck frame, wheels supporting said truck frame, brake rigging adapted to have braking cooperation with said wheels, means for operating said brake rigging, said means including a brake lever, a connection between said brake rigging and said brake lever, an equalizer lever slidably supported with respect to said truck frame and connected adjacent one end thereof to said brake lever, and a brake cylinder supported on said truck frame adjacent the longitudinal center line thereof and having the piston thereof connected adjacent the center of said equalizer lever for controlling movement thereof, said piston operating in a direction outwardly of said truck frame.

24. In a brake arrangement, the combination of a truck frame having an end sill, wheels supporting said truck frame, brake rigging adapted to have braking cooperation with said wheels, means for operating said brake rigging, said means including a brake lever, a connection between said brake rigging and said brake lever, an equalizer lever slidably supported with respect to said truck frame and connected adjacent one end thereof to the inner end of said brake lever, and a brake cylinder supported on said end sill adjacent the center thereof and having the piston thereof connected adjacent the center of said equalizer lever for controlling movement thereof, said piston operating in a direction outwardly of said truck frame.

25. In a brake arrangement, the combination of a truck frame having an end sill, wheels supporting said truck frame, brake rigging adapted to have braking cooperation with said wheels, means for operating said brake rigging, said means including a brake lever disposed outwardly of said sill, a connection between said brake rigging and said brake lever, an equalizer lever slidably supported with respect to said truck frame and connected adjacent one end thereof to the inner end of said brake lever, and a brake cylinder supported on said end sill adjacent the center thereof and having the piston thereof connected adjacent the center of said equalizer lever for controlling movement thereof, said piston operating in a direction outwardly of said truck frame.

26. In a brake arrangement, the combination of a truck frame having an end sill, wheels supporting said truck frame, brake rigging adapted to have braking cooperation with said wheels, means for operating said brake rigging, said means including a brake lever disposed outwardly of said sill, a connection between said brake rigging and said brake lever, an equalizer lever disposed outwardly of said sill and slidably supported with respect to said truck frame and connected adjacent one end thereof to the inner end of said brake lever, and a brake cylinder supported on said end sill adjacent the center thereof and having the piston thereof connected adjacent the center of said equalizer lever for controlling movement thereof, said piston operating in a direction outwardly of said truck frame.

27. In a brake arrangement, the combination of a truck frame having an end sill, wheels supporting said truck frame, brake rigging adapted to have braking cooperation with said wheels, means for operating said brake rigging, said means including a brake lever, a connection between said brake rigging and said brake lever, an equalizer lever disposed outwardly of said sill and slidably supported with respect to said truck frame and connected adjacent one end thereof to the inner end of said brake lever, and a brake cylinder supported on said end sill adjacent the center thereof and having the piston thereof connected adjacent the center of said equalizer lever for controlling movement thereof, said piston operating in a direction outwardly of said truck frame.

28. In a brake arrangement, the combination of a truck frame having an end sill, wheels supporting said truck frame, brake rigging adapted to have braking cooperation with said wheels, means for operating said brake rigging, said means including a brake lever disposed outwardly of said sill, a connection between said brake rigging and said brake lever, an equalizer lever slidably supported with respect to said truck frame and connected adjacent one end thereof to the inner end of said brake lever, and a brake cylinder supported on said end sill adjacent the center thereof and having the piston thereof connected adjacent the center of said equalizer lever for controlling movement thereof, said piston operating in a direction outwardly of said truck frame.

29. In a brake arrangement, the combination of a truck frame having an end sill, wheels supporting said truck frame, brake rigging adapted to have braking cooperation with said wheels, means for operating said brake rigging, said means including a brake lever disposed outwardly of said sill, a connection between said brake rigging and said brake lever, an equalizer lever disposed outwardly of said sill slidably supported with respect to said truck frame and connected adjacent one end thereof to the inner end of said brake lever, and a brake cylinder supported on said end sill adjacent the center thereof and having the piston thereof connected adjacent the center of said equalizer lever for controlling movement thereof.

30. In a brake arrangement, the combination of a truck frame having an end sill, wheels supporting said truck frame, brake rigging adapted to have braking cooperation with said wheels, means for operating said brake rigging, said means including a brake lever, a connection between said brake rigging and said brake lever, an equalizer lever disposed outwardly of said sill and slidably supported with respect to said truck frame and connected adjacent one end thereof to the inner end of said brake lever, and a brake cylinder supported on said end sill adjacent the center thereof and having the piston thereof connected adjacent the center of said equalizer lever for controlling movement thereof.

31. In a brake arrangement, the combination of a truck frame having an end sill, wheels supporting said truck frame, brake rigging adapted to have braking cooperation with said wheels, means for operating said brake rigging, said means including a brake lever disposed outwardly of said sill, a connection between said brake rigging and said brake lever, an equalizer lever slidably supported with respect to said truck frame and connected adjacent one end thereof to the inner end of said brake lever, and means connected to said equalizer lever for controlling movement thereof.

32. In a brake arrangement, the combination of a truck frame having an end sill, wheels supporting said truck frame, brake rigging adapted to have braking cooperation with said wheels, means for operating said brake rigging, said means including a brake lever disposed outwardly of said sill, a connection between said brake rigging and said brake lever, an equalizer lever disposed outwardly of said sill and slidably supported with respect to said truck frame and connected adjacent one end thereof to the inner end of said brake lever, and means connected to said equalizer lever for controlling movement thereof.

33. In a brake arrangement, the combination of a truck frame having an end sill, wheels supporting said truck frame, brake rigging adapted to have braking cooperation with said wheels, means for operating said brake rigging, said means including a brake lever, a connection between said brake rigging and said brake lever, an equalizer lever disposed outwardly of said sill and slidably supported with respect to said truck frame and connected adjacent one end thereof to the inner end of said brake lever, and means connected to said equalizer lever for controlling movement thereof.

34. In a brake arrangement, the combination of a truck frame having an end sill, wheels supporting said truck frame, brake rigging adapted to have braking cooperation with said wheels, means for operating said brake rigging, said means including a brake lever disposed outwardly of said sill, a connection between said brake rigging and said brake lever, an equalizer lever slidably supported with respect to said truck frame and connected adjacent one end thereof to the inner end of said brake lever, and means connected to said equalizer lever for controlling movement thereof.

35. In a brake arrangement, the combination of a truck frame having an end sill, wheels supporting said truck frame, brake rigging adapted to have braking cooperation with said wheels, means for operating said brake rigging, said means including a brake lever disposed outwardly of said sill, a connection between said brake rigging and said brake lever, an equalizer lever disposed outwardly of said sill slidably supported with respect to said truck frame and connected adjacent one end thereof to the inner end of said brake lever, and means connected to said equalizer lever for controlling movement thereof.

36. In a brake arrangement, the combination of a truck frame having an end sill, wheels supporting said truck frame, brake rigging adapted to have braking cooperation with said wheels, means for operating said brake rigging, said means including a brake lever, a connection between said brake rigging and said brake lever, an equalizer lever disposed outwardly of said sill and slidably supported with respect to said truck frame and connected adjacent one end thereof to the inner end of said brake lever, and means connected to said equalizer lever for controlling movement thereof.

WALTER H. BASELT.